C. HALL.
MACHINE FOR STRETCHING CHAINS.
No. 7,192. Reissued June 27, 1876.
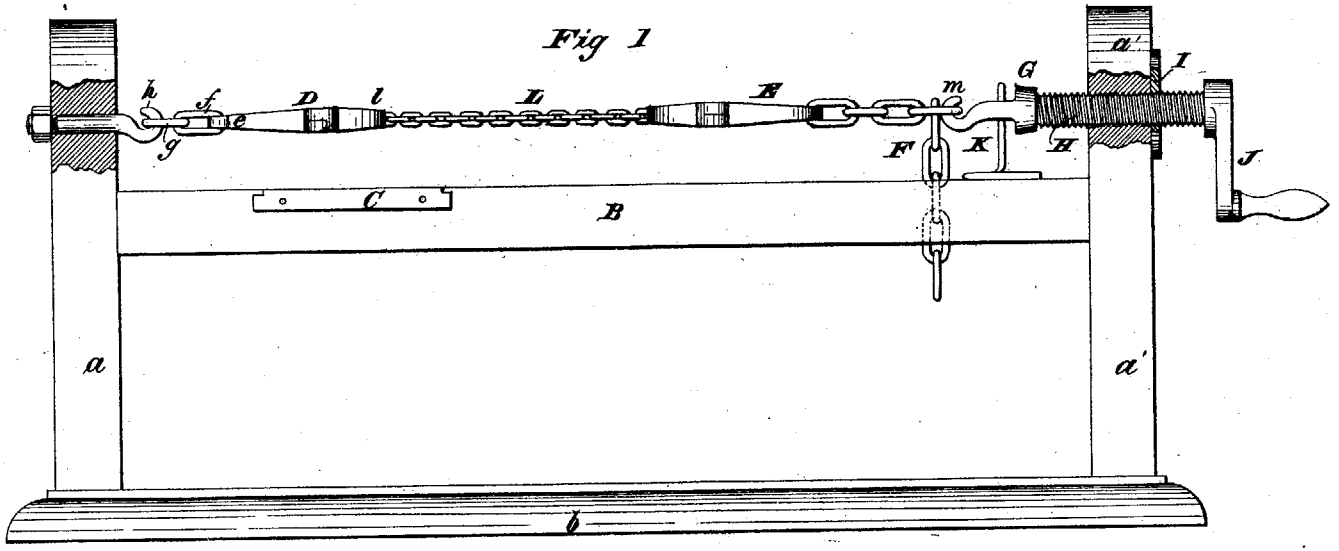
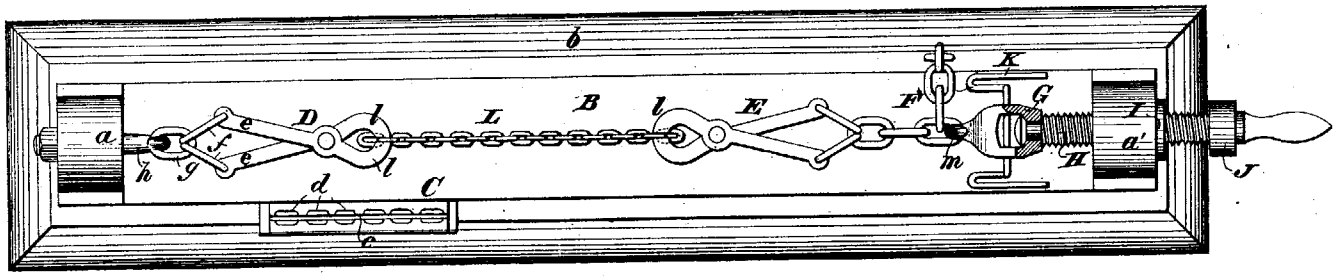
WITNESSES
Wm A Shinkle
F. Stuhl
INVENTOR
Charles Hall,
By his Attorney Marcus S. Hopkins.
N. PETERS, PHOTO-LITHOGRAPHER, WASHINGTON, D. C.

UNITED STATES PATENT OFFICE.

CHARLES HALL, OF NEW YORK, N. Y., ASSIGNOR TO THE YALE LOCK MANUFACTURING COMPANY.

IMPROVEMENT IN MACHINES FOR STRETCHING CHAINS.

Specification forming part of Letters Patent No. 43,987, dated August 30, 1864; reissue No. 7,192, dated June 27, 1876; application filed May 18, 1876.

*To all whom it may concern:*

Be it known that I, CHARLES HALL, of the State, county, and city of New York, have invented a new and useful Improvement in the Process of Making-Chains, and a machine adopted to such process; and I do hereby declare the following to be a clear and exact description thereof, which will enable others skilled in the art to make and use the same, reference being had to the accompanying drawing, making a part of this specification.

The object of my invention is to facilitate the production of what are called pitch or gage chains, all the lengths of which must be exactly alike in order to properly engage with the teeth or recesses of suitable wheels for the purpose of transmitting power. Chains used for this purpose are ordinarily caused to render over pulleys of not large diameter, and even slight irregularities in the pitch tend to cause the chains to creep out of engagement with the teeth or recesses of the wheel, in which case slipping occurs. New chains, when first subjected to strain, will ordinarily stretch, in consequence of irregularities in the contour of the links, and in consequence of the several links adapting their contiguous parts to each other; and it is quite important, therefore, to subject new chains to such tension as will give them a permanent "set" before employing them to engage with toothed or recessed pulleys. My improved process of making chains consists in making the several links of which the chain is composed in the usual manner, and afterward stretching them by means of suitable apparatus until their links fit or conform to a gage, thus insuring perfect uniformity of pitch throughout the whole length of the chain. The manner in which I prefer to accomplish this result is shown in the accompanying drawing, in which—

Figure 1 is an elevation of my stretching-machine, and Fig. 2 a plan of the same.

A represents a framing, composed of two uprights, *a a'*, attached to a suitable base, *b*, and connected near their upper ends by the horizontal bar B. To one side of this bar B there is attached a gage, C, composed of a bar having a groove, *c*, made longitudinally in its upper surfaces, and curved recesses or notches *d d d* at each side of the upper part of said groove. The notches *d*, being all of the same size and at equal distances apart, correspond precisely to the alternate links of a uniform and perfect chain of the desired pitch. D represents a pair of tongs or other suitable clamps capable of engaging with and holding the chain to be stretched at any part of its length by means of the jaws *l l*. The other ends *e e* of the tongs are connected by links *f f* to a ring, *g*, fitted to a hook, *h*, in the upright *a*. At the other end of the machine is a similar pair of tongs or clamps similarly connected and attached to a hook, *m*, of the swivel G on the end of the screw H, which latter passes through the nut I in the upright *a'*, and is operated by means of the crank J on its outer end. The chain F is employed, when required, to rapidly adjust the clamps for different lengths of chain to be stretched.

The jaws *l* of the two pairs of tongs have grooves made in their ends to receive the horizontal links of the chain, the portion of the jaws at each side of the grooves grasping the upright links. By this means the tongs are enabled to grasp the chain firmly. K is a support, which is fitted to the swivel G, and serves to prevent the hook connecting the chain and tongs from twisting. This support slides freely on the bar B. L represents the chain to be stretched and gaged, one end of it held by the tongs or clamp D, and the other by the clamp E. The screw being turned in the proper direction, it is obvious that the portion of the chain L, between the two tongs or clamps, will be stretched. Any portion of the chain L, from one to any number of links, may be thus stretched when necessary, the clamps being adapted to engage with the chain at any portion of its length. The gage C is used for testing or gaging the pitch of the chain after it is stretched to insure uniformity, the groove *e* receiving the vertical links and the notches *d d* the horizontal ones. The gage C being connected with the machine, it is obvious that as each successive length of chain is stretched it can be easily and rapidly gaged, and the stretching process continued until the chain fits accurately into the gage.

I do not confine myself to the precise details of construction of machine herein represented; for it is obvious that the same end, namely, the stretching of the portion of the chain between the clamps, may be equally attained in other ways, without departing from the principle of my invention. Nor do I confine myself to the precise form of tongs or clamps shown in the drawing, but design to use any which are adapted to engage with and securely hold the chain.

Having thus described my invention, what I claim as new, and desire to secure by Letters Patent, is—

1. The process of making pitch or gage chains, as hereinbefore set forth, which consists in forming and uniting their links, and subsequently stretching them by any suitable apparatus until they conform to a desired pitch or gage.

2. The combination, substantially as set forth, of an apparatus for stretching chains, and a gage for measuring the pitch thereof.

3. In a machine for stretching chains, the combination, substantially as set forth, of the devices for holding the chain to be stretched, and mechanism adapted to subject that portion of the chain between the said devices to tension.

4. In a machine for stretching chains, the combination, substantially as set forth, of the devices for holding the chain to be stretched, and apparatus for applying tension thereto, and a gage for measuring the pitch of the chain.

5. In a machine for stretching chains, the combination, substantially as set forth, of the devices for holding the chain to be stretched, the mechanism for applying tension thereto, and the links interposed between said mechanism and said devices for readily varying the longitudinal distance separating said devices from one another.

6. The employment or use of the two pairs of tongs, D E, or other suitable clamps, in connection with the screw H, or its equivalent, arranged substantially as and for the purpose specified.

7. The chain F, or its equivalent, in connection with the swivel G, for conveniently connecting the tongs E to the screw H, as set forth.

8. The gage C, when used in combination with the tongs D E and screw H, or its equivalent, for the purpose specified.

CHARLES HALL.

Witnesses:
JAMES D. VAN VOORHES,
JOHN VAN HENNICK.